United States Patent [19]

Dorf et al.

[11] Patent Number: 5,068,312

[45] Date of Patent: Nov. 26, 1991

[54] POLYARYLENE SULFIDES TERMINATED BY SULFONIC ACID AND/OR SULFONIC ACID DERIVATIVE GROUPS, THEIR PRODUCTION AND USE

[75] Inventors: Ernst-Ulrich Dorf; Wolfgang Rüsseler; Burkhard Köhler; Wolfgang Ebert, all of Krefeld; Walter Schmitt, Neuss, all of Fed. Rep. of Germany

[73] Assignee: Bayer Aktiengesellschaft, Leverkusen-Bayerwerk, Fed. Rep. of Germany

[21] Appl. No.: 502,630

[22] Filed: Apr. 2, 1990

[30] Foreign Application Priority Data

Apr. 11, 1989 [DE]   Fed. Rep. of Germany ....... 3911766

[51] Int. Cl.$^5$ .................... C08G 75/16; C08G 75/14
[52] U.S. Cl. .................... 528/388; 524/609
[58] Field of Search .................... 528/388; 524/609

[56] References Cited

U.S. PATENT DOCUMENTS

| 4,605,713 | 8/1986 | Heitz et al. | |
| 4,605,732 | 8/1986 | Koopmann et al. | |
| 4,820,800 | 4/1989 | Geibel et al. | 528/388 |
| 4,820,801 | 4/1989 | Inoue et al. | 528/388 |
| 4,840,986 | 6/1989 | Inoue et al. | 528/388 |

FOREIGN PATENT DOCUMENTS

| 0053344 | 6/1982 | European Pat. Off. . |
| 0164638 | 5/1985 | European Pat. Off. . |
| 0164639 | 5/1985 | European Pat. Off. . |
| 1056226 | 1/1967 | United Kingdom . |

OTHER PUBLICATIONS

Chemical Abstracts, 105:227349f (1986).

*Primary Examiner*—Morton Foelak
*Attorney, Agent, or Firm*—Connolly and Hutz

[57] ABSTRACT

The invention releates to oligo- and polyarylene sulfides, preferably polyphenylene sulfides, terminated by sulfonic acid and/or sulfonic acid derivative groups, to their production and to their use for the production of new polymers and new polymer mixtures.

3 Claims, No Drawings

POLYARYLENE SULFIDES TERMINATED BY SULFONIC ACID AND/OR SULFONIC ACID DERIVATIVE GROUPS, THEIR PRODUCTION AND USE

This invention relates to oligo- and polyarylene sulfides, preferably polyphenylene sulfides, terminated by sulfonic acid and/or sulfonic acid derivative groups, to their production and to their use for the production of new polymers and new polymer mixtures.

Polyphenylene sulfides containing functional groups are already known [cf. for example U.S. Pat. No. 3,354,129, Intern. J. Polymeric Mater. 11 (1987) 263]. Phenylene sulfide polymers and oligomers terminated by functional groups, such as carboxyl groups, nitrile groups, etc. are also known (telechels) [cf. for example Polymer Bulletin 4 (1981) 459, FR-A 2 470 780, DE-A 34 21 608, DE-A 34 21 610].

The present invention relates to oligo- and polyarylene sulfides, preferably oligo- and polyphenylene sulfides, corresponding to formula (I)

in which
Y represents —OR, —OM or —NR$_2$, where R is as defined for formulae (II), (III) and (IV),
n is an integer of $\geq 2$, preferably $\geq 2 \leq 100$,
m is the number 0, 1 or 2,
M represents H, an alkali metal, an alkaline earth metal·$\frac{1}{2}$ a metal of group III·$\frac{1}{3}$,
X represents halogen, mercapto, mercaptide or another —S(O)$_m$—Y-group,
the Ar's may be the same or different and represent groups corresponding to formulae (II), (III) and/or (IV)

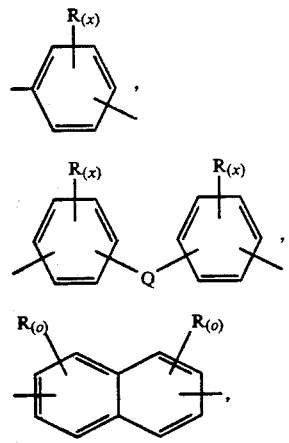

in which
the R's may be the same or different and may represent hydrogen, C$_{1-20}$ alkyl, C$_{4-20}$ cycloalkyl, C$_{6-24}$ aryl, C$_{7-24}$ arylalkyl; two substituents R in the ortho position to one another may be attached to form an aromatic or heterocyclic ring containing N, O or S as heteroatoms, and
Q is a single bond or groups with two bonds, such as —Ar$^1$—, —O—, —S—, —SO—, —SO$_2$—, —(CR$_2$)$_p$, —CO—, —CO—Ar$^2$—CO— where R is as defined above, Ar$^1$ is an aromatic C$_{6-24}$ radical with two bonds and p is an integer of 1 to 24, x is the number 1, 2, 3 or 4,
o is the number 1, 2 or 3.
M preferably represents an alkali metal, such as Na, K, an alkaline earth metal, such as Mg, Ca, Ba, or a metal of the third group of the periodic system of elements (Hollmann-Wiberg, Lehrbuch der Anorganischen Chemie, Walter de Gruyter & Co., 1964),
X preferably represents halogens, such as Cl, Br, an —SH, —S$^{(-)}$M-group, where M is as defined above.

It is known that stabilized polyphenylene sulfides can be produced by reaction of preformed polyphenylene sulfides (N$\geq$20) with aromatic monohalogen compounds containing electron-attracting substituents, such as -halogen-, —SO$_2$—, —CO—, —NO$_2$—, —SO$_3$R—, —COOR (cf. for example EP-A 53 344). However, polymers containing functional and reactive groups are not obtained in this way. The polymers obtained are very stable.

Accordingly, the present invention also relates to a process for the production of the oligo- and polyarylene sulfides, preferably oligo- and polyphenylene sulfides, corresponding to formula (I), characterized in that a) one or more (hetero)aromatic dihalogen compounds corresponding to formulae (V), (VI) and/or (VII)

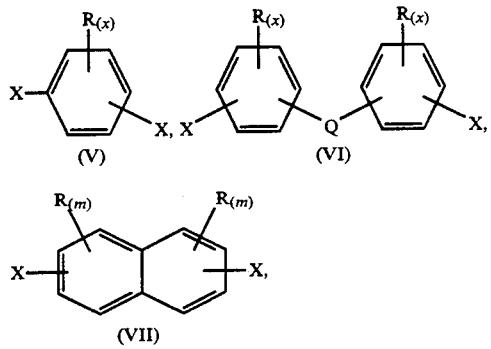

in which
X represents halogen, chlorine or bromine,
the R's may be the same or different and represent hydrogen, C$_{1-20}$ alkyl, C$_{4-20}$ cycloalkyl, C$_{6-24}$ aryl, C$_{7-24}$ alkylaryl and C$_{7-24}$ arylalkyl; two substituents R in the ortho position to one another may be attached to form an aromatic or heterocyclic ring containing N, O or S as heteroatoms, and
Q represents a single bond or groups with two bonds, such as —Ar—, —O—, —S—, —SO—, —SO$_2$—, —(CR$_2$)$_p$—, —CO—, —CO—Ar—CO—, —CO—NH—, —CO—NH—Ar—NH—CO—, in which R is as defined above, Ar represents a C$_{6-24}$ aromatic radical with two bonds and p is an integer of 1 to 24,
x is the number 1, 2, 3 or 4,
m is the number 1, 2 or 3, and b) 0.5 to 25 mol-% and preferably 1 to 10 mol-%, based on the sum total of the aromatic dihalogen compounds corresponding to formulae (V), (VI) and/or (VII), of a compound corresponding to formula (VIII)

in which
m is the number 0, 1 or 2,
X represents halogen, such as chlorine or bromine, Y represents —OR, —OM or —NR$_2$, where R is as defined for formulae (II), (III) and (IV), M represents hydrogen, an alkali metal, an alkaline earth metal ·½, a metal of the main group III ⅓⅓ and Ar and R are as defined for formula (I), and c) 0 to 5 mol-%, based on the sum total of the aromatic dihalogen compounds corresponding to formulae (V), (VI) and/or (VII), of an aromatic trihalogen or tetrahalogen compound corresponding to formula (IX)

$$Ar^1X_n \qquad (IX)$$

in which

Ar$^1$ is an aromatic or heterocyclic C$_{6-24}$ radical,

X represents halogen, such as bromine or chlorine, and n is the number 3 or 4, and d) as sulfur donor, 50 to 100 mol-% sodium or potassium sulfide and 0 to 50 mol-% sodium or potassium hydrogen sulfide, the molar ratio of (a+b+c) to d being in the range from 0.75:1 to 1.15:1, are reacted with one another e) in an organic solvent, optionally in the presence of catalysts and/or co-solvents, the molar ratio of d) to the organic solvent being from 1:2 to 1:15, and the reaction is carried out by mixing aqueous alkali sulfide and/or alkali hydrogen sulfide solutions with solutions of the aromatic halogen compounds in an organic solvent at temperatures above 212° C.

Examples of aromatic dihalogen compounds of formula (V) suitable for use in accordance with the invention are 1,4-dichlorobenzene, 1,4-dibromobenzene, 1-bromo-4-chlorobenzene, 1,3-dichlorobenzene, 1,3-dibromobenzene, 1-bromo-3-chlorobenzene, 2,5-dichlorotoluene, 2,5-dichloroxylene, 1,4-dichloro-2-ethyl benzene, 1,4-dibromo-2-ethyl benzene, 1,4-dichloro-2,3,5,6-tetramethyl benzene, 1,4-dichloro-2-cyclohexyl benzene, 2-benzyl-1,4-dichlorobenzene, 2,4-dichlorotoluene, 2,4-dichloroxylene, 2,4-dichlorocumene.

1,4-Dichlorobenzene, 1,3-dichlorobenzene and 2,5-dichlorotoluene are preferred.

Examples of aromatic dihalogen compounds of formula (VI) suitable for use in accordance with the invention are 4,4'-dichlorodiphenyl1,4,4'-dibromodiphenyl1,4,4'-dichlorobenzophenone, 3,3'-dichlorobenzophenone, 4,4'-dichlorodiphenyl sulfone, 1,4-bis-(4'-chlorobenzoyl)-benzene, 1,4-bis-(3'-chlorobenzoyl)-benzene.

4,4'-Dichlorodiphenyl, 4,4'-dichlorodiphenyl sulfone and 4,4'-dichlorobenzophenone are preferred.

Examples of aromatic dihalogen compounds of formula (VII) suitable for use in accordance with the invention are 1,4-dichloronaphthalene, 1,4-dibromonaphthalene, 1,5-dichloronaphthalene, 2,6-dichloronaphthalene, 2,6-dibromonaphthalene, 2,7-dichloronaphthalene, 2,7-dibromonaphthalene, 1,8-dichloronaphthalene and 1,8-dibromonaphthalene.

The aromatic dihalogen compounds corresponding to formulae (V), (VI) and/or (VII) may be used individually or in admixture with one another.

Examples of compounds corresponding to formula (VIII) suitable for use in accordance with the invention are 2-chlorobenzenesulfonic acid, 3-chlorobenzenesulfonic acid, 4-chlorobenzenesulfonic acid, 4-(4-chlorophenyl)-benzenesulfonic acid, 4-(3-chlorophenyl)-benzenesulfonic acid, 3-(4-chlorophenyl)-benzenesulfonic acid, 3-(3-chlorophenyl)benzenesulfonic acid, 5-chloro-2-methyl benzenesulfonic acid, 3-chloro-4-methyl benzenesulfonic acid, 1-chloro-2-naphthalenesulfonic acid, 4-chloro-2-naphthalenesulfonic acid, 4-chloro-1-naphthalenesulfonic acid, 5-chloro-1-naphthalenesulfonic acid, 5-chloro-2-naphthalenesulfonic acid, 8-chloro-2-naphthalenesulfonic acid, 8-chloro-1-naphthalenesulfonic acid, 2-chloro-1-naphthalenesulfonic acid, 3-chloro-1-naphthalenesulfonic acid, 6-chloro-1-naphthalenesulfonic acid, 6-chloro-2-naphthalenesulfonic acid, 7-chloro-2-naphthalenesulfonic acid, 7-chloro-1-naphthalenesulfonic acid and the corresponding bromine compounds. Salts (for example M=alkali, alkaline earth, metal of the third main group), esters or amides of the compounds mentioned may also be used.

Examples of aromatic trihalogen or tetrahalogen compounds corresponding to formula (IX) suitable for use in accordance with the invention are 1,2,4-trichlorobenzene, 1,3,5-trichlorobenzene, 2,2',4,4'-tetrachlorodiphenyl, 2,2',4,4'-tetrachlorodiphenyl sulfide, 1,3,5-trichlorotriazine, 1,2,6-trichloronaphthalene and tris-(4-chlorophenyl)-benzene.

Alkali sulfides, for example sodium or potassium sulfide, may be used for example as sulfur donors in the usual quantities and in the usual way. Sulfides prepared from the hydrogen sulfides, for example with sodium or potassium hydroxide, may be used. They contain 1 to 9 mol water per mol sulfide and may be used in the form of a melt, optionally together with catalysts.

Suitable alkali hydrogen sulfides are, for example, sodium or potassium hydrogen sulfides. They may be prepared from hydroxides and hydrogen sulfide. They may also be prepared from sulfides with hydrogen sulfide. They may contain from 1 to 4 mol water.

Organic solvents suitable for use in accordance with the invention are aprotic solvents, particularly N-C$_{1-10}$-alkylated lactams, such as for example N-methyl pyrrolidone, N-ethyl pyrrolidone, N-methyl piperidone, N-isopropyl pyrrolidone, N-methyl caprolactam, or disubstituted cyclic ureas, such as for example N,N'-dimethyl pyrimidazolidinone and N,N'-dimethyl imidazolidinone.

The boiling point of the solvents should be in the range from 212° C. to 280° C. To reach this temperature range, the reaction may be carried out under a slight excess pressure (up to approx. 10$^3$ bar).

N,N-dialkyl carboxylic acid amides of aliphatic C$_{1-18}$ and aromatic C$_{6-12}$ carboxylic acids, for example N,N-dimethyl acetamide, N,N-diethyl acetamide, N,N-dimethyl propionamide, may be used as co-solvents, for example in a quantity of from 0.2 to 1 mol per mol sodium or potassium sulfide.

Suitable catalysts are the substances typically used for this purpose which may be employed in the usual quantities, for example alkali salts, for example sodium or potassium fluorides, phosphates, carboxylates or capronates, in quantities of from 0.02 to 1.0 mol catalyst per mol S donor.

The reaction may be carried out by adding the aromatic halogen compounds corresponding to formulae (V), (VI), (VII), (VIII) and/or (IX), optionally with the catalysts and/or co-solvents and the aqueous hydrogen sulfides and/or sulfides, to the reaction mixture either simultaneously or successively. The temperature of the reaction mixture is at least 212° C. The water is removed spontaneously with recycling of the aromatic halogen compounds which distill off azeotropically. The water content of the reaction mixture is up to 0.02% by weight.

The reaction time may be varied over a wide range and may be from less than 1 hour to several days, but is preferably between 1 hour and 48 hours and more preferably between 2 and 18 hours. Unreacted aromatic halogen compounds may be separated off from the reaction mixture, for example by distillation, on completion of the reaction. The polyarylene sulfides are isolated, for example, by cooling, filtering and washing the reaction mixture first with ketones, such as acetone, or alcohols, such as methanol, ethanol or isopropanol. The residue is suspended in water in a ratio of 1 part residue to 5-20 parts water. The suspension obtained is adjusted to pH 1-5 with acids, such as acetic acid, hydrochloric acid, phosphoric acid, sulfuric acid, etc., and then washed with water until neutral. The polyarylene sulfides thus obtained are substantially free from electrolyte.

The polymers and/or oligomers according to the invention have molecular weights $M_n$ in the range from 500 to 100,000.

The molecular weights of the oligo- and polyphenylene sulfides according to the invention are determined, for example, by a chromatographic method (cf. for example EP-A 171 021).

Other inorganic or organic oligomers or polymers may be added to the functional oligo- or polyarylene sulfides produced in accordance with the invention, optionally in the presence of pigments, fillers and other additives.

The new oligo- and polyarylene sulfides, preferably polyphenylene sulfides, according to the invention terminated by sulfonic acid and/or sulfonic acid derivative groups may be used for the production of new polymers by melting, optionally with addition of other polymers, preferably other polyarylene sulfides, such as polyphenylene sulfide.

Accordingly, the present invention relates to the use of the new oligo- and polyarylene sulfides, preferably oligo- and polyphenylene sulfides, terminated by sulfonic acid and/or sulfonic acid derivative groups for the production of new polymers, characterized in that a) 50 to 100% by weight and preferably 75 to 100% by weight polymers corresponding to formula (I)

$$Y-(O)_mS-[Ar-S]_n-Ar-X \qquad (I)$$

in which

Y represents —OR, —OM or —NR$_2$, where R is as defined for formulae (II), (III) and (IV), n is an integer of $\geq 2$, preferably $\geq 2 \leq 100$, m is the number 0, 1 or 2, M represents H, an alkali metal, an alkaline earth metal ·½, a metal of group III·⅓, X represents halogen, mercapto, mercaptide or another —S(O)$_3$M—Y— group, the Ar's may be the same or different and represent groups corresponding to formulae (II), (III) and/or (IV)

(II)

(III)

(IV)

in which the R's may be the same or different and may represent hydrogen, C$_{1-20}$ alkyl, C$_{4-20}$ cycloalkyl, C$_{6-24}$ aryl, C$_{7-24}$ arylalkyl; two substituents R in the ortho position to one another may be attached to form an aromatic or heterocyclic ring containing N, O or S as heteroatoms, and Q is a single bond or groups with two bonds, such as —Ar—, —O—, —S—, —SO—, —SO$_2$—, —(CR$_2$)$_p$, —CO—, —CO—Ar$^1$—CO—, where R is as defined above, Ar$^1$ is an aromatic C$_{6-24}$ radical with two bonds and p is an integer of 1 to 24, x is the number 1, 2, 3 or 4, o is the number 1, 2 or 3, and b) 0 to 50% by weight and preferably 0 to 25% by weight branched polyarylene sulfides corresponding to formula (X)

$$-Ar-S- \qquad (X)$$

in which Ar is as defined for formula (I) are melted with one another.

The treatment time in the melt is from 0.5 to 500 minutes and preferably from 10 to 100 minutes.

A suitable temperature for the treatment according to the invention in the melt is a temperature in the range from 280° C. to 450° C. and preferably in the range from 300° C. to 360° C. In one particular embodiment moldings of the polyarylene sulfides according to the invention may also be thermally aftertreated at temperatures above 150° C. by solid-phase reaction.

Polyarylene sulfides (PAS), preferably polyphenylene sulfides (PPS), suitable for use in accordance with the invention are known (cf. for example U.S. Pat. No. 3,354,129, EP-A 166 368, EP-A 171 021) and are commercially obtainable.

The process according to the invention may be carried out in an inert gas atmosphere (for example nitrogen, noble gases, such as argon), in vacuo or in air in suitable apparatus such as, for example, kneaders (screws), extruders, etc.

The present invention also relates to the use of the new polyarylene sulfides produced in accordance with the invention, optionally in combination with standard reinforcing materials, fillers and/or auxiliaries, as shaped articles.

Shaped articles in the context of the invention may be extrudates, such as fibers, films, profiles, pipes, etc., injection-molded articles and/or composite materials.

To calibrate molecular weight, the melt viscosity $\eta m$ of the polymer melt (in Pa.s) was determined at 360° C. as a function of the shear rate (in Pa) using an Instron rotational viscosimeter.

It is possible in this way to determine melt viscosity over a very wide range from $10^{-1}$ to $10^7$ Pa.s. In the Instron rheometer, the polymer is melted between a fixed plate and a rotatable cone and the torque of the cone is determined.

Melt viscosity can be calculated as a function of the shear rate from the torque, the angular velocity and the instrument data. An Instron model 3250 rheometer, diameter of the cone and plate 2 cm, was used. The melt viscosity measured at a shear rate of $\tau$ of $10^2$ Pa is the value shown.

The polymers or polymer mixtures according to the invention may be directly processed to films, moldings, semifinished goods or fibers by extrusion, extrusion blow molding, injection molding or other standard processing techniques. These articles may be typically used, for example, as automotive components, fittings, valves, ball bearing parts, electrical components, such as for example switches, electronic boards, parts and equipment resistant to chemicals and weathering, such as pump housings and pump flywheels, etching baths, sealing rings, parts of office machines, communications equipment and domestic appliances. The polymers and polymer mixtures according to the invention invention are preferably used in the electrical/electronics field.

The present invention also relates to highly crystalline, rapidly crystallizing, thermoplastic compounds of mixtures of special polyarylene sulfides. They may be used as raw materials for the production of fibers, films and moldings.

By virtue of their partially crystalline structure, they show outstanding properties, including for example high wear resistance, favorable long-term behavior and high dimensional accuracy. They are eminently suitable for the production of parts subjected to severe mechanical and thermal stressing.

An additional improvement in the mechanical properties may be obtained by the incorporation of reinforcing materials, for example glass fibers.

The production of moldings of polyarylene sulfide (PAS) by injection molding is difficult because high mold temperatures (>130° C.) and relatively long press-molding times are necessary. Mold temperatures >130° C. can be problematical because the molds are normally designed for a temperature around 100° C. (heating medium water). Molds which are heated by other media, for example oil, and reach temperatures >110° C. are generally rare and are not economical to use. Accordingly, the desired temperatures are very often not reached in practice and the temperature distribution is uneven. On account of these disadvantages, it is economically unattractive to apply such high mold temperatures in injection molding.

In addition, it is desirable to reach high crystallinity as quickly as possible to obtain an optimal property level. High crystallinity guarantees hardness and dimensional stability, even at relatively high temperatures. In addition, the residence time in the mold determines the duration of the injection cycle which is among the factors determining economy.

Even at the high mold temperatures for the processing of polyarylene sulfide, these cycles are relatively long and are an obstacle to the advance of the polyarylene sulfide in the production of injection-molded articles.

It is known that certain additives such as, for example, non-oxidizing acids or their salts (cf. for example EP-A 259 188, EP-A 260 871), aromatic carboxylic acids (EP-A 193 951), oligomeric esters (EP-A 212 478), sulfonic acid esters (EP-A 218 946), certain carboxylic acid esters (EP-A 236 835), thioethers (EP-A 236 834) or phosphoric acid esters (EP-A 236 836), increase the crystallization rate of polyarylene sulfide molding compounds. However, additives such as these also affect the property profile of the molding compounds. Thus, low molecular weight compounds for example can exude or evaporate and problems can be caused by heat resistance, incompatibility of the additives with other auxiliaries, high electrolyte content (for example in applications in the electrical/electronics field) or the like.

Polyarylene sulfides show higher crystallinity and a high crystallization rate without any of the above-mentioned disadvantages arising if they contain 0.1 to 50 parts and preferably 0.5 to 25 parts, based on 100 parts of the total quantity of resin, of new oligo- or polyarylene sulfide corresponding to formula (I) terminated by at least one sulfonic acid or sulfonic acid derivative group. This enables the degree of crystallinity required for high dimensional stability to be achieved and, hence, the polyphenylene sulfide compounds to be processed with far shorter injection cycles.

Another advantage of the polyarylene sulfide compounds according to the invention lies in the reduction in the mold temperature without any adverse effect on the favorably crystallization behavior. The injection molding compound cools down more quickly, further shortening the residence time in the mold.

The present invention relates to highly crystalline, rapidly crystallizing thermoplastic compounds consisting of a) 0.1 to 50 parts and preferably 0.5 to 25 parts polyarylene sulfides corresponding to formula (I)

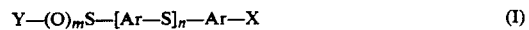
$$Y—(O)_m S—[Ar—S]_n—Ar—X \qquad (I)$$

in which Y, m, n, M, X and Ar are as already defined, and b) 50 to 99.9 parts and preferably 75 to 99.5 parts optionally branched polyarylene sulfides corresponding to formula (IV)

$$—Ar—S— \qquad (IV)$$

in which Ar is as defined for formula (I) and c) 0 to 250 parts standard reinforcing materials, fillers and/or auxiliaries.

The present invention also relates to a process for the production of the polyarylene sulfides according to the invention, characterized in that a mixture of polyarylene sulfides corresponding to formula (I) with polyarylene sulfides corresponding to formula (IV), optionally in admixture with typical reinforcing materials, fillers and/or auxiliaries, is prepared in the melt, for example in screws, extruders or kneaders or other suitable units.

The treatment time in the melt is between 0.1 and 500 minutes and preferably between 0 and 100 minutes.

A suitable temperature for the treatment according to the invention in the melt is one in the range from 280 to 45° C. and preferably in the range from 300° to 360° C.

Moldings of the polyarylene sulfide mixtures according to the invention may also be thermally aftertreated at temperatures above 150° C. by solid-phase reaction.

The process according to the invention may be carried out in an inert gas atmosphere, for example of nitrogen or argon, in vacuo or in air.

The present invention also relates to the use of the polyarylene sulfide mixtures according to the invention for the production of shaped articles, for example extrudates, such as fibers, films, profiles, pipes, etc., injection-molded articles and/or composite materials.

The isothermal crystallization rate ($t_{\frac{1}{2}}$; time required to reach maximal energy flow at certain temperatures), the temperature of the dynamically measured crystallization $T_{cryst}$ (maximum value; cooling rate 10K/min) and the associated energy content ($\Delta H_{cryst}$) are determined in differential scanning calorimeters as a measure of the crystallization rate of the samples. The samples are stored beforehand for 10 minutes at 330° C. The crystallization values at 110° C. are obtained from amorphous sample materials which may be produced after the melt treatment by quenching with liquid nitrogen.

The thermal stability of the samples (decomposition, evaporation) is evaluated by thermogravimetric analysis. To this end, approx. 10 mg sample is heated under nitrogen at a rate of 20K/min in a Perkin-Elmer TGS 2 and the weight loss at 300° C., 350° C. and 400° C. is determined.

The polymers or polymer mixtures according to the invention may be blended with 0 to 250% by weight, based on polymer, of standard fillers and reinforcing materials and/or auxiliaries such as, for example, glass fibers, talcum, mica, other inorganic fillers, for example carbonates, quartz, carbon, nucleating agents, pigments, etc.

The fillers may be added at any temperature before or during preparation of the mixture. A more complete list of possible additives and/or fillers and/or reinforcing material is disclosed in Modern Plastics encyclopedia 1988 Vol. 64, No. 10A. p. 127-194.

The polymers or polymer mixtures according to the invention may be directly processed to films, moldings, semifinished goods or fibers by extrusion, extrusion blow molding, injection molding or other standard processing techniques. These articles may be typically used, for example, as automotive components, fittings, valves, ball bearing parts, electrical components, such as, for example switches, electronic boards, parts and apparatus resistant to chemicals and weathering, such as pump housings and pump flywheels, etching baths, sealing rings, parts of office machines, communications equipment and domestic appliances. The polymers and polymer mixtures according to the invention are preferably used in the electrical/electronics field.

EXAMPLE 1

Production of polyarylene sulfide terminated by sulfonic acid groups 756.75 g sodium sulfide hydrate (approx. 60%), 135 g sodium hydroxide and 108 g caprolactam were added at 215° C. to 2100 g N-methyl caprolactam, 940.8 g p-dichlorobenzene and 27.5 g p-chlorobenzene sulfonic acid, Na salt (the addition rate is determined by the conversion and is adjusted in such a way that the temperature of 215° C. can be maintained by simultaneous additional heating of the reaction vessel. The water formed during the reaction is removed during the addition. After the addition, the reaction mixture is kept under reflux. After another 9 hours' reaction time, the PPS is precipitated in isopropanol, acidified in water, washed until free from electrolyte and dried in a vacuum drying cabinet.

EXAMPLES 2-6

Mixtures of a polyphenylene sulfide ($\eta m = 8$ Pa.s) and the product of Example 1 were kneaded under nitrogen for 10 minutes at 340° C. The melt viscosity of the samples obtained is determined.

TABLE 1

|  | Example 1 | PPS | in Pa.s $\eta m$ before | $\eta m$ after |
|---|---|---|---|---|
| Example 2 | — | 100 | 8 | 8 |
| Example 3 | 50 | 50 | n.d. | 12 |
| Example 5 | 75 | 25 | n.d. | 250 |
| Example 6 | 100 | — | approx. 20 | 3000 |

EXAMPLE 7

Preparation of polyarylene sulfide terminated by sulfonic acid groups 1134.4 g sodium sulfide hydrate (approx. 60%), 6.7 g sodium hydroxide, 325.0 g water and 141.2 g caprolactam were added at 215° C. to 2700 g N-methyl caprolactam, 1192.5 g p-dichlorobenzene and 89.3 g p-chlorobenzene sulfonic acid. The addition rate depends on the conversion and is adjusted in such a way that the temperature of 215° C. can be maintained by simultaneous additional heating of the reaction vessel. The water formed during the reaction is removed during the addition. After the addition, the reaction mixture is kept under reflux. After another 9 hours' reaction time, the PPS is precipitated in isopropanol, acidified in water, washed until free from electrolyte and dried in a vacuum drying cabinet.

EXAMPLE 8

Production of polyarylene sulfide terminated by sulfonic acid groups 1134.4 g sodium sulfide hydrate (approx. 60%), 6.7 g sodium hydroxide, 325.0 g water and 141.2 g caprolactam were added at 215° C. to 2700 g N-methyl caprolactam, 1100.8 g p-dichlorobenzene and 357.1 g p-chlorobenzene sulfonic acid, reflux. After another 9 hours' reaction time, the PPS is precipitated in isopropanol, acidified in water, washed until free from electrolyte and dried in a vacuum drying cabinet.

The addition rate depends on the conversion and is adjusted in such a way that the temperature of 215° C. can be maintained by simultaneous additional heating of the reaction vessel. The water formed during the reaction is removed during the addition. After the addition, the reaction mixture is kept under reflux. After another 9 hours' reaction time, the PPS is precipitated in isopropanol, acidified in water, washed until free from electrolyte and dried in a vacuum drying cabinet.

EXAMPLES 9-14

Mixtures of a polyphenylene sulfide ($\eta m = 8$ Pa.s) and the material of Example 1 were kneaded under nitrogen for 10 minutes at 340° C. The melt viscosity and crystallization properties of the samples obtained were determined.

TABLE 2

| Example | % PPS (8 Pa.s) | % Product of Ex. 1 | $\eta m$ | $T_{cryst}$ (°C.) | $\Delta H_{cryst}$ (J/g) | $t_{\frac{1}{2}}$ (110° C.) | $t_{\frac{1}{2}}$ (240° C.) | Remarks |
|---|---|---|---|---|---|---|---|---|
| 9 | 100 | — | 8 | 222 | 52 | 3.4 | 1.0 | Standard |
| 10 | 99 | 1 | 11 | 250 | 56 | 0.5 | <0.2 | Invention |
| 11 | 98 | 2 | 10 | 253 | 60 | 0.2 | <0.2 | " |
| 12 | 95 | 5 | 9 | 254 | 61 | 0.15 | <0.2 | " |
| 13 | 90 | 10 | 12 | 252 | 61 | 0.15 | <0.2 | " |
| 14 | 50 | 50 | 14 | 252 | 59 | 0.2 | <0.2 | " |

EXAMPLES 15, 16, 17

Production of molding compounds

Further components:
GF: sized 6 mm glass fibers, fiber diameter approx 10 μm
T: microtalcum The molding compounds were produced by mixing and homogenizing the components in the melt at a melt temperature of approx. 300° to 320° C. in a Werner and Pfleiderer ZSK 32 twin-extruder and their crystallization properties subsequently determined.

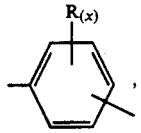  (II)

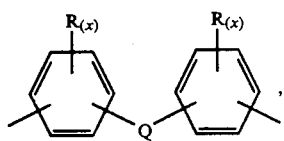  (III)

TABLE 3

| Example | % PPS (50 Pa.s) | % GF | % T | Prod. of Ex. 1 | $T_{cryst}$ (°C.) | $t_{\frac{1}{2}}$ (110° C.) Mins. | $t_{\frac{1}{2}}$ (240° C.) Mins. | Remarks |
|---|---|---|---|---|---|---|---|---|
| 15 | 52 | 45 | 3 | — | 229 | 4 | 0.9 | Comp. |
| 16 | 52 | 45 | — | 3 | 237 | 0.2 | 0.2 | Invention |
| 17 | 49 | 48 | — | 3 | 242 | 0.3 | 0.2 | Invention |

EXAMPLES 18-22

Mixtures of a polyphenylene sulfide ($\eta m = 8$ Pa.s) and various additives were kneaded under nitrogen for 10 minutes at 340° C. The samples obtained were evaluated for stability by TGA measurement.

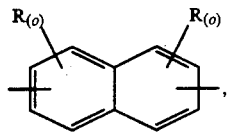  (IV)

TABLE 4

| Example | % PPS (8 Pa.s) | Additive | % Additive | TGA % Weight loss at 300° C. | 350° C. | 400° C. | Remarks |
|---|---|---|---|---|---|---|---|
| 18 | 90 | Ex. 1 | 10 | 0.2 | 0.3 | 0.4 | Invention |
| 19 | 90 | * | 10 | 2.3 | 2.9 | 5.0 | Comp. with EP-A 218946 |
| 20 | 90 | ** | 10 | 3.7 | 4.5 | 7.3 | Comp. with EP-A 236835 |
| 21 | 90 | *** | 10 | 1.0 | 1.5 | 5.5 | Comp. with EP-A 212478 |
| 22 | 100 | — | — | 0.2 | 0.3 | 0.4 | Standard |

*Paraffin sulfonic acid phenyl ester ($C_{12-18}$)
**Adipic acid dioctyl ester
***adipic acid polyester of 1,3-butane diol and 1,6-hexane diol

We claim:

1. Oligo- and polyarylene sulfides corresponding to formula (I)

$$Y-S(O)_mS-(Ar-S-)_n-Ar-X \quad (I)$$

in which
Y represents —OR, —OM or —NR$_2$, where R is as defined for formulae (II), (III) and (IV) below,
n is an integer of $\geq 2$
m is the number 0, 1 or 2,
M represents H, an alkali metal, an alkaline earth metal ·$\frac{1}{2}$, a metal or group III ·$\frac{1}{3}$,
X represents halogen, mercapto, mercaptide or —S-(O)$_3$M—Y— group,
the Ar's are the same or different and represent groups corresponding to formulae (II), (III) and/or (IV)

in which
the R's are the same or different and represent hydrogen, C$_{1-20}$ alkyl, C$_{4-20}$ cycloalkyl, C$_{6-24}$ aryl, C$_{7-24}$ arylalkyl, two substituents R in the ortho position to one another are attached to form an aromatic or heterocyclic ring containing N, O or S as heteroatoms, and
Q is a single bond or Q represents groups with two bonds, Ar$^1$ is an aromatic C$_{6-24}$ radical with two bonds and p is an integer of 1 to 24,
x is the number 1, 2, 3 or 4,
o is the number 1, 2 or 3.

2. Highly crystalline, rapidly crystallizing thermoplastic compounds consisting of
a) 0.1 to 50 parts polyarylene sulfides claimed in claim 1 and corresponding to formula (I)

$$Y-(O)_mS-[Ar-S]_n-Ar-X \quad (I)$$

in which Y, m, n, M, X and Ar are as defined in claim 1, and b) 50 to 99.9 parts of unbranched or branched polyarylene sulfides corresponding to formula (IV)

$$-Ar-S- \qquad (IV)$$

in which Ar is as defined for formula (I) and c) 0 to 250 parts reinforcing materials, fillers and/or auxiliaries.

3. A process for the production of the oligo- and polyarylene sulfides corresponding to the formula (I)

$$Y-S(O)_mS-(Ar-S)_n-Ar-X \qquad (I)$$

wherein a) one or more (hetero)aromatic dihalogen compounds corresponding to formula (V), (VI) and/or (VII)

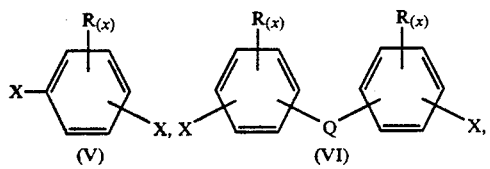

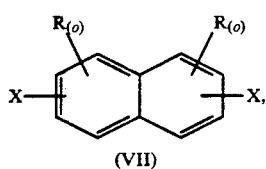

in which

X represents halogen, chlorine or bromine, the R's are the same or different and represent hydrogen, $C_{1-20}$ alkyl, $C_{4-2}$ cycloalkyl, $C_{6-24}$ aryl, $C_{7-24}$ alkylaryl and $C_{7-24}$ arylalkyl; two substituents R in the ortho position to one another are attached to form an aromatic or heterocyclic ring containing N, O or S as heteroatoms, and Q represents a single bond or groups with two bonds, Ar represents a $C_{6-24}$ aromatic radical with two bonds and p is an integer of 1 to 24, x is the number 1, 2, 3 or 4, o is the number 1, 2 or 3, and b) 0.5 to 25 mol-% based on the sum total of the aromatic dihalogen compounds corresponding to formulae (V), (VI) and/or (VII), of a compound corresponding to formula (VIII)

$$X-Ar-S(O)_m-Y \qquad (VIII)$$

in which m is the number 0, 1 or 2,

X represents halogen,

Y represents —OR, —OM or —$NR_2$, where R is as defined for formulae (V), (VI) and (VII)

M represents hydrogen, an alkali metal, an alkaline earth metal $\cdot\frac{1}{2}$, or a metal of the main group III $\cdot\frac{1}{3}$ and Ar corresponds to the formula (V), (VI) or (VII) without X, and c) 0 to 5 mol-%, based on the sum total of the aromatic dihalogen compounds corresponding to formulae (V), (VI) and/or (VII), of an aromatic trihalogen or tetrahalogen compound corresponding to formula (IX)

$$Ar^1X_n \qquad (IX)$$

in which $Ar^1$ is an aromatic or heterocyclic $C_{6-24}$ radical,

X represents halogen and n is the number 3 or 4, and d) as sulfur donor, 50 to 100 mol-% sodium or potassium sulfide and 0 to 50 mol-% sodium or potassium hydrogen sulfide, the molar ratio of (a+b+c) to d being in the range from 0.75:1 to 1.15:1, are reacted with one another e) in an organic solvent with the molar ratio of d) to the organic solvent being from 1:2 to 1:15, and the reaction is carried out by mixing aqueous alkali sulfide and/or alkali hydrogen sulfide solutions with solutions of the aromatic halogen compounds in an organic solvent at temperatures above 212° C.

* * * * *